(12) United States Patent
Adachi

(10) Patent No.: US 7,000,130 B2
(45) Date of Patent: Feb. 14, 2006

(54) METHOD AND APPARATUS FOR THERMAL THROTTLING OF CLOCKS USING LOCALIZED MEASURES OF ACTIVITY

(75) Inventor: Mitsuhiro Adachi, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 503 days.

(21) Appl. No.: 09/749,088

(22) Filed: Dec. 26, 2000

(65) Prior Publication Data

US 2002/0083354 A1 Jun. 27, 2002

(51) Int. Cl.
G06F 1/26 (2006.01)
G06F 1/28 (2006.01)
G06F 1/32 (2006.01)

(52) U.S. Cl. .................. 713/322; 713/300; 713/320; 713/323; 713/324; 713/340

(58) Field of Classification Search ............. 713/300, 713/32, 722, 323, 324, 340
See application file for complete search history.

(56) References Cited

U.S. PATENT DOCUMENTS

| | | | |
|---|---|---|---|
| 5,392,437 A | | 2/1995 | Matter et al. |
| 5,451,892 A | * | 9/1995 | Bailey ................. 327/113 |
| 5,490,059 A | * | 2/1996 | Mahalingaiah et al. ..... 713/501 |
| 5,719,800 A | | 2/1998 | Mittal et al. |
| 5,768,213 A | * | 6/1998 | Jung et al. ............. 365/233 |
| 5,822,596 A | * | 10/1998 | Casal et al. ............. 713/322 |
| 5,825,674 A | | 10/1998 | Jackson |
| 5,926,367 A | | 7/1999 | Gutierrez et al. |
| 5,956,563 A | * | 9/1999 | Klink et al. ............. 713/300 |
| 5,996,083 A | * | 11/1999 | Gupta et al. ............. 713/322 |
| 6,158,012 A | * | 12/2000 | Watts, Jr. ............... 713/322 |
| 6,216,235 B1 | * | 4/2001 | Thomas et al. ............ 713/323 |
| 6,397,343 B1 | * | 5/2002 | Williams et al. ........... 713/501 |

FOREIGN PATENT DOCUMENTS

JP             05011877 A    *    1/1993

OTHER PUBLICATIONS

Marculescu, D.; "Profile–driven code execution for low power dissipation", Low Power Electronics and Design, 2000. ISLPED '00. Proceedings of the 2000 International Symposium on, Jul. 26–27, 2000, pp. 253–255.*

Jacob Millman, Ph.D., Charles Batchelor Professor, Emeritus, Columbia University, "Microelectronics, Digital and Analog Circuits and Systems," McGraw–Hill Book Co., 1979, pps. 673–676.

Raymond M. Warner, Jr., Director of Engineering, Motorola Inc., Semiconductor Products Division, "Integrated Circuits, Design Principles and Fabrication," McGraw Hill Book Co., 1965, pps. 362–368.

Ray P. Prasad, SMT Program Manager, Intel Corporation, "Surface Mount Technology,, Principles and Practice," Van Nostrand Reinhold, New York, 1989, pps. 178–181.

(Continued)

Primary Examiner—Lynne H. Browne
Assistant Examiner—James K. Trujillo
(74) Attorney, Agent, or Firm—Blakely, Sokoloff, Taylor and Zafman

(57) ABSTRACT

Thermal throttling control to safely throttle clocks OFF and ON in an integrated circuit. Digital thermal throttling control is provided to gradually throttle a clock's frequency from ON to OFF and from OFF to ON. The gradual throttling can minimize an instantaneous current rise that would otherwise occur with a rapid shut OFF and a rapid turn ON of a clock. Included are methods and apparatus for digital thermal throttle control in an integrated circuit.

59 Claims, 6 Drawing Sheets

OTHER PUBLICATIONS

Adel S. Sedra, Univerity of Toronto, Kenneth C. Smith, University of Toronto and Hong Kong, "Microelectronic Circuits," 4th Ed., Oxford Univ. Press, 1998, pps. 773–778.

"Intel486™ Microprocessor and Related Products," Microprocessors, PCIsets, Peripheral Components, Intel Corporation, 1995, pps. 2–304, 2–313 to 2–318.

Vladimir Aleksiev, "Thermal Deisgn for High Performance Notebooks," Intel Corporation, Order No. 241812–001, Oct. 1993, pps. 2–493 to 2–508.

Chen Xie, MCG Technical Marketing, "Managing Power with the SL Enhanced Intel486™ Microprocessor," Intel Corporation, Order No. 241811–001, Oct. 1993, pps. 2–485 to 2–490.

Philip Brace, "Clock Throttling the SI Enhanced Intel468™ CPU in a Networked Environment," Intel Corporation, Order No. 421988–001, May 1994, pps. 2–513 to 2–541.

Jacob Fraden, "Handbook of Modern Sensors—Physics, Designs, and Applications," 1996, pps 10–32, 59–62, 98–114, 190–195, 414–429, Second Ed., Springer–Verlag New York.

* cited by examiner

METHOD AND APPARATUS FOR THERMAL THROTTLING OF CLOCKS USING LOCALIZED MEASURES OF ACTIVITY

FIELD OF THE INVENTION

The present invention relates generally to the field of thermal management of integrated circuits. Particularly, the present invention relates to thermal management circuits which throttle clocks of an integrated circuit to control its temperature.

BACKGROUND OF THE INVENTION

Heat in electronic circuitry if not dissipated sufficiently enough can reduce performance, cause soft errors, and in a worst case—result in catastrophic failure requiring replacement of components. The heat generated by electronic circuitry is a direct function of clock frequency. Temperature, a measure of heat, is proportional to power consumption which in turn is proportional to operational frequency. In order to reduce the temperature of a silicon junction in a processor, heat at the junction needs to be dissipated into the ambient air somehow. With processors now exceeding clock frequencies of one gigaHertz, methods of heat dissipation are even more important.

Various well know methods to dissipate heat in circuitry can be employed. For example passive techniques such as heat slugs, heat spreaders or heat sinks can be employed to increase the heat dissipation from circuitry into the atmosphere. Active techniques, such as an air/fan cooling system or a liquid cooling system can also be used to increase heat dissipation from circuitry.

Generally in integrated circuitry when power consumption is reduced, less heat is generated which needs to be dissipated. In order to conserve power in integrated circuit processors, circuit activity has been analyzed. When circuitry is not active, it is desirable to turn off clocks to the inactive circuitry. It was generally assumed that this would reduce the heat generated. While this may be true over an average, it is not necessarily true instantaneously. In some cases when a clock is abruptly stopped to circuitry, the heat generated actually increases causing the thermal temperature of the integrated circuitry to rise.

It is desirable to improve the thermal management of integrated circuits.

BRIEF DESCRIPTION OF THE DRAWINGS

The features and advantages of the present invention will become apparent from the following detailed description of the present invention in which.

Like reference numbers and designations in the drawings indicate like elements providing similar functionality.

DETAILED DESCRIPTION OF THE INVENTION

Figure 1:
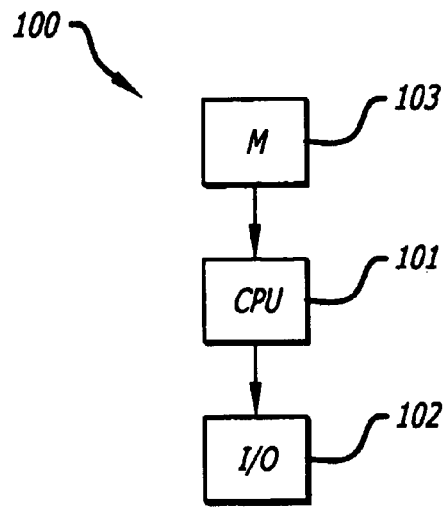
FIG. 1 is a block diagram of a typical computer 100 in which the present invention can be utilized.

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail so as not to unnecessarily obscure aspects of the present invention.

Thermal throttling allows a processor to cool down in trade for performance. The most common technique to thermally throttle a processor is to stop the internal clock. In some cases, suddenly stopping the internal clock to circuitry results in a di/dt variation where the current instantaneously spikes which can lead to even greater power consumption and thermal increases. Advanced chip process technologies using lower voltage supplies, dynamic circuit designs, and higher clock frequencies make circuits more sensitive to noise and the any current spikes from di/dt variations when the internal clock is suddenly stopped to provide thermal throttling. The present invention provides safe thermal throttling of clocks within a processor to minimize di/dt increases.

The present invention provides digital thermal throttling of clocks to functional blocks in an integrated circuit. The digital thermal throttling of clocks is a gradual one so as to provide safe thermal throttling. The present invention accumulates the localized functional activity of functional blocks in an integrated circuit to determine a measure of global functional activity therein. The present invention then determines whether or not the measure of global functional activity meets or exceeds a thermal activity limit of an integrated circuit, such as a processor. If so, the integrated circuit is forced into an execution stall where the clock is gradually turned off or stopped in circuitry to avoid large variations in di/dt during clock shut down. The clock is shut down for a pre-programmed number of clock cycles after which, the clock is gradually turned on or started so that large di/dt variations are avoided when starting the clock. The forced execution stall is then removed so that the integrated circuit can start full processing once again. During the gradual shut down and starting of the clock, the ratio of the throttled clock frequency to the free running clock frequency is controlled so that it changes gradually over a range of N/N, (N−1) (N−2)/N, . . . 2/N, 1/N and 0/N. An interval timer (i.e. a counter) counting a value M sets how the clock frequency transitions during the shut down and start up of clocks such as between (N−I)/N and (N−I−1)/N. The endurance level of di/dt establishes the parameters M which establishes N. The endurance level of di/dt is the level which limits the normal function of circuitry. In other words, the endurance level of di/dt is a safety margin at which circuitry functions. The endurance level of di/dt depends on a number of factors including the fabrication technology or process technology used to manufacture the integrated circuit, circuit implementation (i.e. the type of logic whether its dynamic, static, or pseudo-static logic), the level of voltage supply VDD (i.e. 2 volts, 1.8 volts, 1.6 volts, or less than 1.0 volts), and the free-running clock frequency (i.e. 1 GHz, 2 GHz, 3 GHz, etc).

Referring now to FIG. 1, a block diagram of a typical computer 100 in which the present invention is utilized is illustrated. The computer 100 includes a central processing unit (CPU) 101, input/output devices (I/O) 102 such as keyboard, modem, printer, external storage devices and the like and monitoring devices (M) 103 such as a CRT or graphics display. The monitoring devices (M) 103 provide computer information in a human intelligible format such as visual or audio formats.

Figure 2:
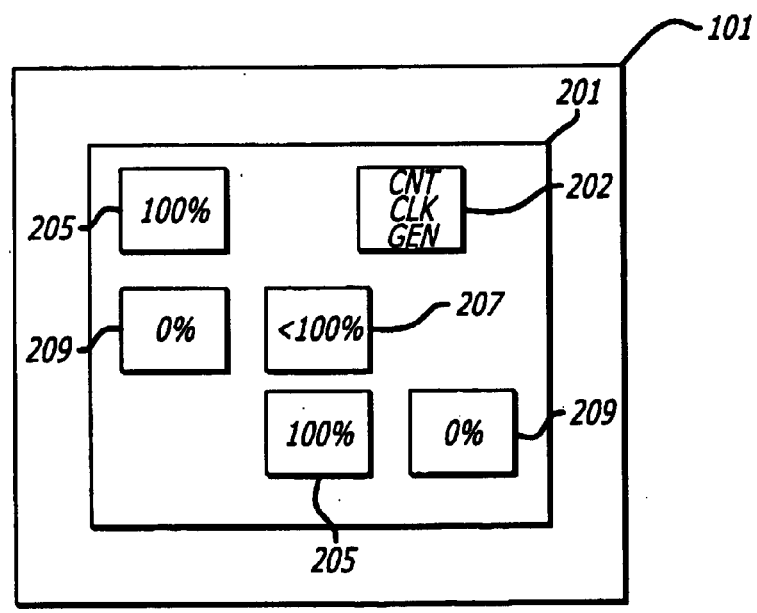
FIG. 2 is a block diagram of a typical central processing unit and typical integrated circuit in which the present invention can be utilized.

Referring now to FIG. 2, a block diagram of a typical central processing unit 101 in which the present invention is utilized is illustrated. The central processing unit 101 includes one or more integrated circuits 201, such as one or more microprocessors, which incorporates the present invention. The integrated circuit 201 includes a controlled clock generator (CNT CLK GEN) 202 with thermal throttling control in order to appropriately clock the circuitry therein to reduce heat generation and lower the junction temperature of the integrated circuit die. Functional blocks or units of circuitry in the integrated circuit 201 can be cataloged into three types based on the percentage of circuitry to which the clocks can be turned off or shut down. The integrated circuit 201 includes one or more functional blocks 205 to which 100% of the circuitry that the internal clock can be shut down. The integrated circuit 201 includes one or more functional blocks 207 to which less than 100% of the circuitry that the internal clock can be shut down. The integrated circuit 201 includes one or more functional blocks 209 to which 0% or none of the circuitry that the internal clock can be shut down. That is, the one or more functional blocks 209 need to be constantly clocked while the integrated circuit 201 is functioning. For example, the functional blocks 209 may need to handle external events received by the integrated circuit 201 such as a snoop into an internal cache memory, interrupt requests or bus requests which require constant monitoring. Thus, power consumption can be reduced from the functional blocks to which the clock can be turned OFF.

Figure 3:
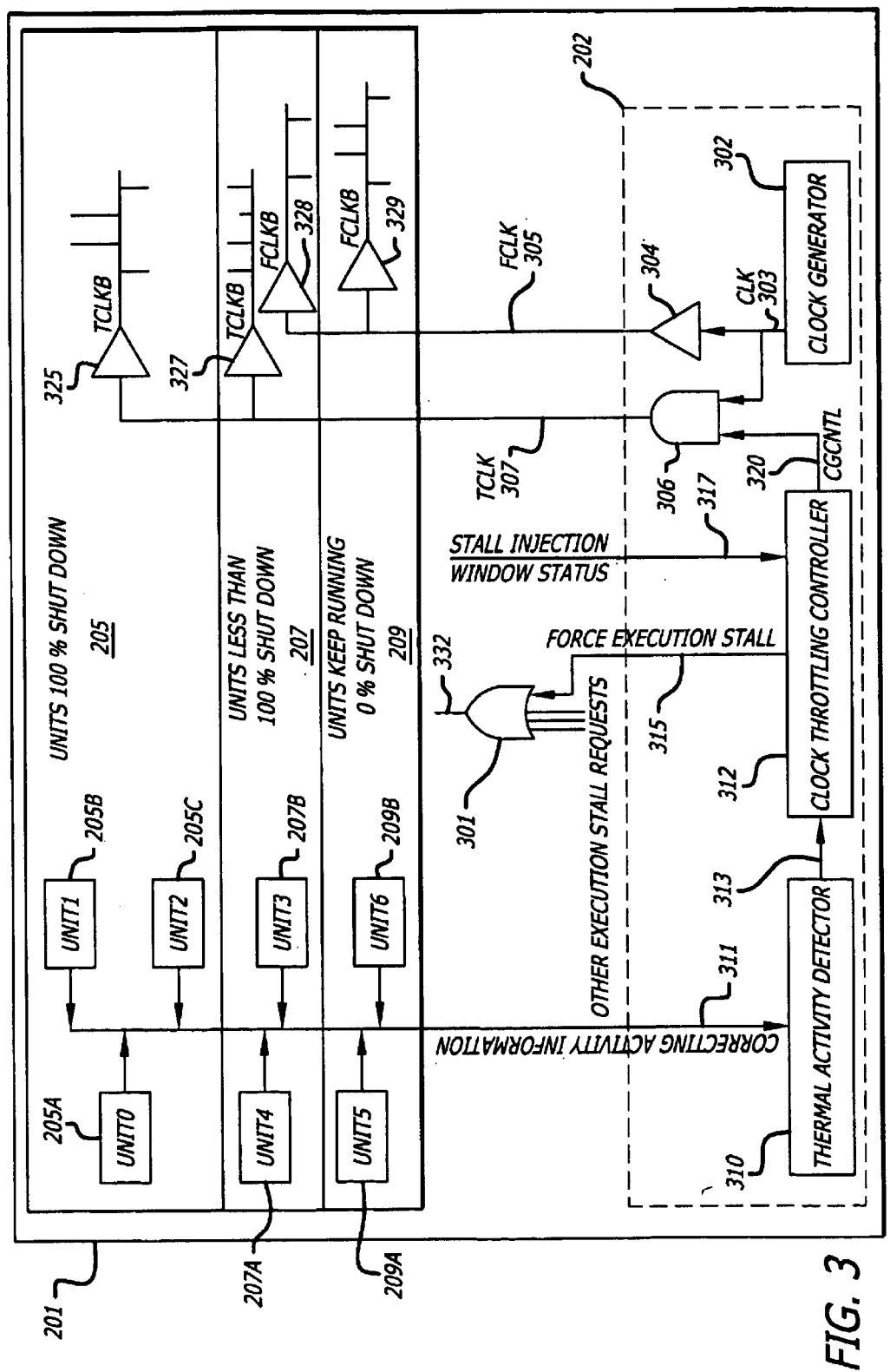
FIG. 3 is a detailed block diagram of the thermal clock throttling control provided by the present invention within a typical integrated circuit.

Referring now to FIG. 3, a block diagram of a typical integrated circuit 201 including the present invention is illustrated. The integrated circuit 201 illustrated in FIG. 3 includes the controlled clock generator 202, the one or more functional blocks 205, the one or more functional blocks 207, the one or more functional blocks 209, and a logical gate 301. The one or more functional blocks 205 includes functional blocks 205A, 205B, and 205C labeled unit0, unit1 and unit2, respectively. The one or more functional blocks 207 includes functional blocks 207A and 207B labeled unit3 and unit4, respectively. The one or more functional blocks 209 includes functional blocks 209A and 209B labeled unit5 and unit6, respectively.

The controlled clock generator 202 includes a free-running clock generator 302, a buffer 304, a logical gate 306, a thermal activity detector 310, and a clock throttling controller 312. The free-running clock generator 302 is a typical clock generator that may include a phase locked loop (PLL), a frequency synthesizer, and/or a quartz crystal oscillator to generate a free-running clock signal CLK 303 of a desired frequency. The buffer 304 buffers a load on a free-running clock signal line FCLK 305 from the clock generator 302. The logical gate 306, an AND gate formed out of a NAND gate and an inverter, gates the free-running clock signal CLK 303 with a clock gating control signal CGCNTL 320 to generate a throttled clock signal TCLK 307. For the one or more functional blocks 205, a buffer 325 buffers the throttled clock signal TCLK 307 to generate a buffered throttled clock signal TCLKB. The buffered throttled clock signal TCLKB is coupled to the clocked circuitry of all of the one or more functional blocks 205 so that one hundred percent of the circuitry in the functional blocks 205 are shut down into a stable state. For the one or more functional blocks 207, a buffer 327 buffers the throttled clock signal TCLK 307 to generate a buffered throttled clock signal TCLKB and a buffer 328 buffers the free-running clock signal FCLK 305 to generate a buffered free-running clock signal FCLKB. The buffered throttled clock signal TCLKB is coupled to some of the clocked circuitry of the one or more functional blocks 207 so that less than one hundred percent of the circuitry in the functional blocks 207 are shut down into a stable state. Each of the one or more functional blocks 207 receives both the buffered throttled clock signal TCLKB and the buffered free-running clock signal FCLKB. For the one or more functional blocks 209, a buffer 329 buffers the free-running clock signal FCLK 305 to generate a buffered free-running clock signal FCLKB. Each of the one or more functional blocks 329 receives the buffered free-running clock signal FCLKB so that none of their circuitry is shut down or turned OFF.

The thermal activity detector 310 of the controlled clock generator 202 receives activity information from all of the functional blocks 205, 207, and 209 over activity information signal lines 311 to generate a total measure of functional activity for the integrated circuit 201. The functional activity in the integrated circuit is proportional to a temperature level of the integrated circuit. The thermal activity detector 310 corrects the activity information received over the activity information signal lines 311 for each of the functional blocks if needed. That is, the activity detector 310 monitors the magnitude of the activity of each functional block and adjusts or appropriately weights the level of functional activity of each functional block in order to obtain a measure of global activity to estimate the power consumption and heat generated in the entire integrated circuit. The thermal activity detector 310 determines whether or not the measure of total activity of the integrated circuit meets or exceeds a predetermined limit of activity (referred to as a "thermal limit") where it is desirable to reduce the heat generated by the activity in the integrated circuit to achieve a safe temperature level. If the thermal activity detector 310 determines that the measure of total activity of the integrated circuit meets or exceeds the predetermined limit of activity, it generates an enable thermal throttling signal 313 indicating excessive activity. The enable thermal throttling signal 313 is coupled to the clock throttling controller 312 to signal when the thermal limit of activity has been met or exceeded.

The clock throttling controller 312 receives the enable thermal throttling signal 313 and responds accordingly generating the clock gating control signal CGCNTL 320 and in the case of a processor integrated circuit, a force execution stall signal 315 to assert a processor stall request. The clock gating control signal CGCNTL 320 performs the throttling of the free running clock CLK 303 periodically such that the frequency of the throttled clock signal TCLK 307 can vary. The frequency of the throttled clock signal TCLK 307 is decreased by reducing the number of clock pulses within a given period of clock cycles. From a stopped clock with zero frequency, the frequency of throttled clock signal TCLK 307 is increased by increasing the number of clock pulses within a given period of clock cycles. The proportion of the frequency between the throttled clock TCLK and the free-running clock FCLK can vary over a range between N/N, (N−1)/N, (N−2)/N, ..., 1/N and 0/N where N is the ordinary number of clock pulses within the given period of clock cycles. To reduce the frequency, pulses are removed in the given period and to increase the frequency, pulses are inserted in the given period.

The logical gate 301 receives the force execution stall signal 315 from the clock throttling controller 312 as well as other execution stall request signals from other blocks. The logical gate 301, logically ORs all the stall requests together to generate a stall signal 332. The stall signal is coupled to the functional blocks 205, 207 and 209 of the integrated circuit 201 to prepare for stopping the clock to circuitry.

Figure 4:
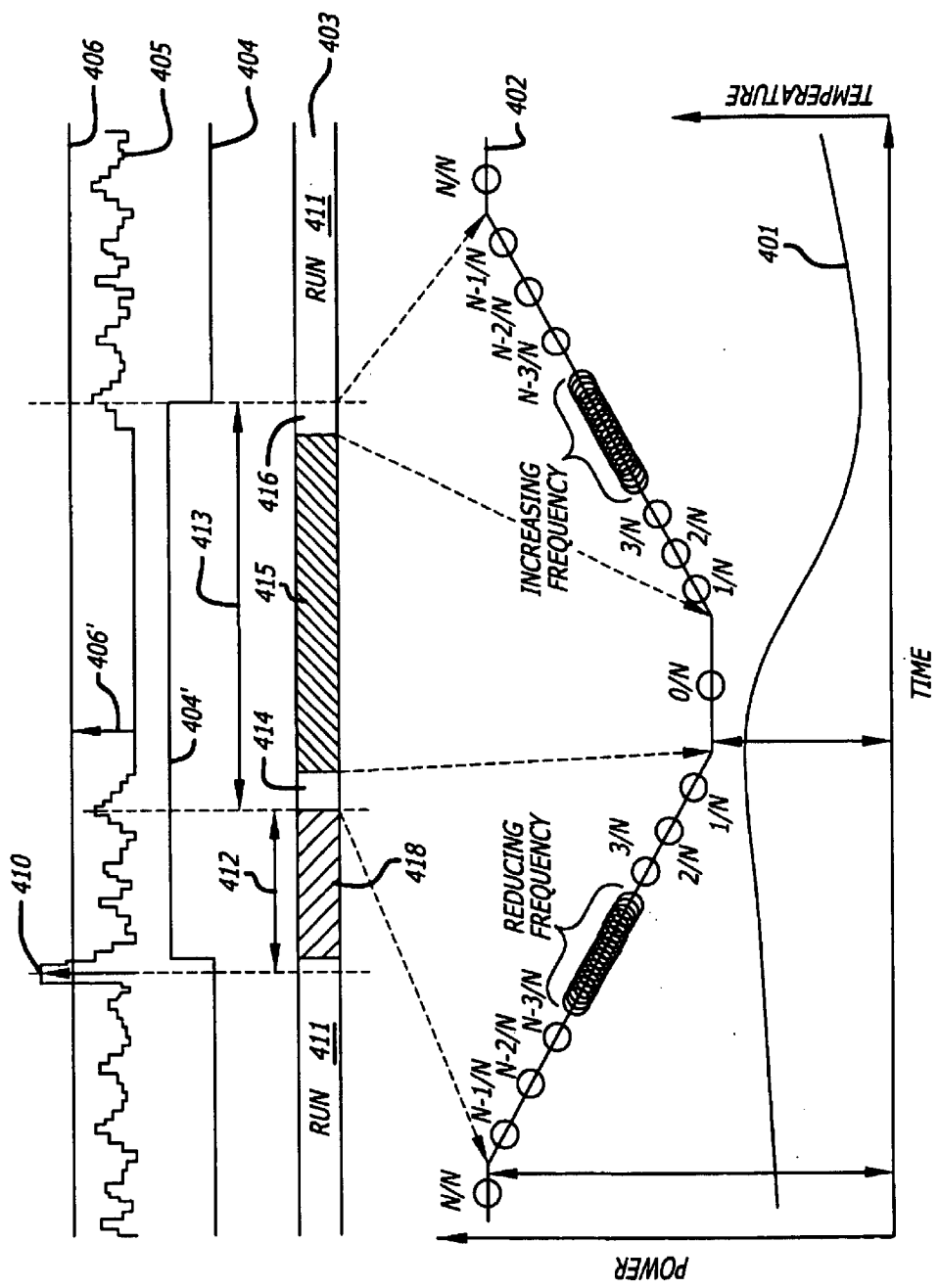
FIG. 4 is a waveform diagram illustrating the functionality of the thermal clock throttling control provided by the present invention.

Referring now to FIG. 4, waveform diagrams 401–406 illustrate the exemplary functionality of the thermal clock throttling control provided by the present invention. Waveforms 401 and 402 are plotted on an X axis representing an exploded period of time of a clock throttling cycle. Waveform 401 is a temperature waveform corresponding to the right Y axis of Temperature. Waveform 402 is a power waveform corresponding to the left Y axis of Power expanded in time. Waveform 403 illustrates the status of the integrated circuit, such as a processor. Waveform 404 is an exemplary waveform of the force execution stall signal 315. Waveform 405 is an exemplary total activity waveform such as that which would be measured by the thermal activity detector 310. Waveform 406 illustrates the thermal limit 406−, a programmed threshold value, which when exceeded by the waveform 405 initiates the sequence of thermal clock throttling provided by the present invention. In the example of FIG. 4, the total activity of the integrated circuit exceeds the thermal limit 406− at point 410 on the waveform 405 during "surging processor activity, for example, which is detected.

As illustrated by waveform 403, the integrated circuit 201 experiences a run cycle 411, a response cycle 412 after reaching the thermal limit, a throttling cycle 413 over which the clocks are gradually throttled OFF and then back ON, and a return to a run cycle 411. The throttling cycle 413 provides a safe frequency transition sequence.

During the throttling cycle 413, the clocks are gradually throttled OFF during a clock throttling period 414, held OFF for a period of time during a hold period 415 and gradually throttled ON during a clock throttling period 416. During clock throttling period 414, the frequency of the clock provided to circuitry is gradually reduced to zero to provide the gradual clock throttling where the clocks are throttled OFF. This is indicated along waveform 402 by the ratio of clock pulses for a given period decreasing from N/N to 0/N. During clock throttling period 416, the frequency of the clock provided to circuitry is gradually increased from zero to provide the gradual clock throttling where the clocks are throttled ON. This is indicated along waveform 402 by the ratio of clock pulses for a give period increasing from 0/N to N/N. During the hold period 415, CGCNTL 320 gates the clock CLK 303 by means of the logic gate 307 so that the throttled clock 307 is OFF and has zero frequency. This is indicated along waveform 402 by the ratio of clock pulses for a give period being 0/N. The power consumption indicated during the hold period 415 is a constant typically greater than zero for those circuits that remain being clocked by FCLK 305 and can not be turned OFF using TCLK 307. The throttling cycle 413 may be a function of the activity level".

During the run cycles 411, the integrated circuit 201 functions normally until the functional activity exceeds the thermal limit as illustrated by point 410 in the waveform 405. After reaching or exceeding the thermal limit, the integrated circuit goes into a response cycle 412.

"During the response cycle 412, a forced execution stall signal 404− is asserted as indicated by waveform 404 and a stall state 418 is entered into where the circuitry and the functional blocks 205 and 207 prepare to have the throttled clock TCLK 307 gradually turned OFF. After the necessary states are saved, the integrated circuit goes into the throttling cycle 413 previously described in detail. After the throttling cycle 413 is completed, the forced execution stall signal 404− is de-asserted and the integrated circuit returns to the run cycle.

As illustrated by waveform 402, power consumption gradually decreases as the clocks are turned OFF and gradually increases as clocks are turned ON. As illustrated by waveform 401, the temperature waveform lags the power waveform and decreases some time after the power has decreased and begins increasing some time after the power has increased.

In summary, the present invention as illustrated in FIG. 4 causes the frequency of the throttled clock to be gradually throttled OFF and then ON in response to the measure of the functional activity meeting or exceeding the predetermined limit. The present invention first continuously determines if a predetermined limit of global functional activity in an integrated circuit has been met or exceeded. The global functional activity of an integrated circuit is proportional to temperature. The predetermined limit of global functional activity is proportional to an expected temperature level in an integrated circuit. If the predetermined limit of global functional activity in the integrated circuit has been met or exceeded, the present invention reduces the high frequency of clocking of circuitry gradually to zero in order to stop the clocking of circuitry.

To reduce the high frequency clocking of circuitry gradually to zero, the present invention waits a predetermined time during the clocking of the circuitry at a first frequency before clocking the circuitry at a second frequency lower than the first frequency. This continues on and on gradually stepping to lower frequencies with waiting periods in between until the next frequency step is zero frequency where the clock is stopped. With the clocks stopped to certain circuitry, the global functional activity in the integrated circuit should decrease to a lower level.

After stopping the clocking of circuitry, the present invention then waits a predetermined time and then starts the clocking of circuitry back up at a low frequency. After starting the clocking of the circuitry at the low frequency, the present invention gradually increases the frequency of the clocking of the circuitry to the high frequency.

The present invention gradually increases the frequency of clocking circuitry to the high frequency by clocking circuitry at a first frequency, waiting a predetermined time while clocking the circuitry at the first frequency and then clocking the circuitry at a second frequency higher than the first frequency. This continues on and on gradually stepping to next higher frequencies with waiting periods in between until the next frequency step is the high frequency where the clock is free-running.

The gradual reduction in the high frequency clocking of the circuitry to zero frequency and the gradual increase in the clocking of circuitry from zero frequency to the high frequency avoids large variations in current otherwise associated with a rapid shut-off and a rapid turn-on of clocking circuitry.

Figure 5:
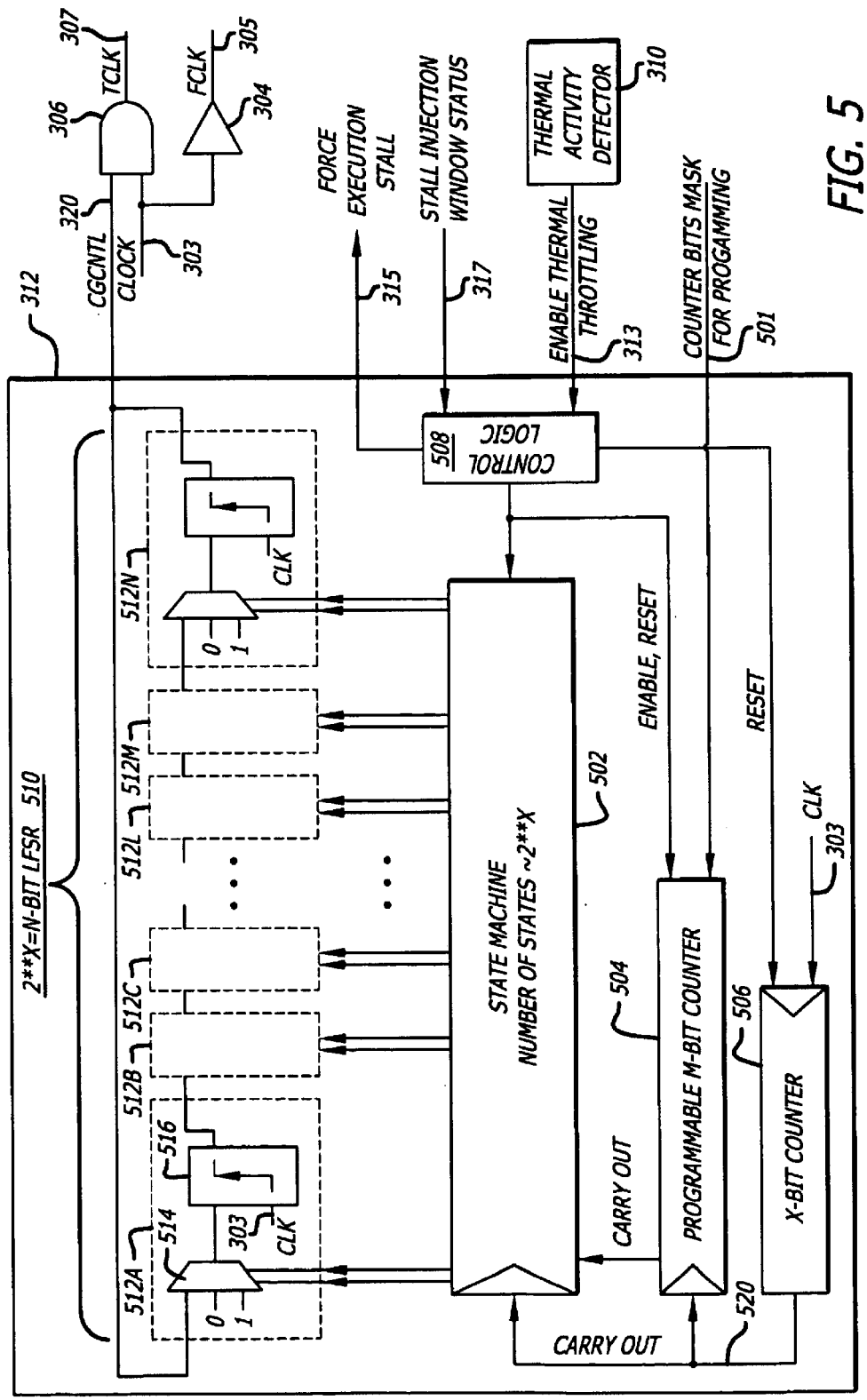
FIG. 5 is a detailed block diagram of the clock throttling controller coupled to other functional blocks of the present invention.

Referring now to FIG. 5, a functional block diagram of the clock throttling controller 312 is illustrated. Also illustrated in FIG. 5 is the thermal activity detector 310 coupled to the clock throttling controller 312 by means of the enable thermal throttling signal 313 and logic gate 306 and buffer 304. The clock throttling controller 312 includes a state machine 502, a programmable M-bit counter 504, an X-bit counter 506, control logic 508 and an N–bit Linear Feedback Shift Register (LFSR) 510.

The LSFR 510 generates the clock gating control signal CGNTL 320 to control the gating of the clock CLK 303 in order to generate the throttled clock TCLK 307. The N-bit LSFR 510 includes N stages 512A–512N where each stage, generally referred to as stage 512, includes a three-to-one multiplexor 514 and a D flip-flop 516. The number of stages N in the LSFR 510 is to $2^X$ where X is the number of bits in the X-bit counter 506. The N stages 512A–512N are configured into a loop where the input of the prior or last stage is received and the output is coupled into the next or first stage. The final stage 512N of the LSFR 510 generates the clock gating control signal CGNTL 320 which is coupled into the logic gate 306 to generate the throttled clock TCLK 307. The output selection of each of the three-to-one multiplexors 514 in each stage 512 is controlled by control signals from the state machine 502. Each multiplexor receives three inputs to select from including the output from the prior stage, logical zero, or logical one. The input selected as the output from the multiplexor is coupled into the D-flip-flop 516 for shifting into the next stage of the loop on the next clock cycle.

The X-bit counter 506 basically provides synchronization of the LFSR 510 and divides down the frequency of the clock CLK 303 to reduce power consumption of the clock throttling controller 312, to relax the timing in the decoding of logic within the state machine 502, and provide for a more compact functional block using less circuitry. In order to divide down the frequency of the clock CLK 303 by X, the counter 506 has X-bits and its carry out signal 520 is used as the clock for the clocking input to the sequential elements (latches and flip-flops) of the state machine 502 and the counter 504 instead of the clock CLK 303.

The control logic 508, in response to receiving the enable thermal throttling signal 313 and stall injection window status 317, generates the force execution stall signal 315; resets the state machine, the programmable M-bit counter 504, and the X-bit counter 506; and enables the clocking of the M-bit counter 504 and the state machine 502. The stall injection window status 317 is the specific clock cycles of the integrated circuit when stall requests can be handled immediately. In a processor, an instruction pipeline has certain clock cycles when it can be immediately stalled and other clock cycles where it can not accept an immediate stall request. In this case the stall injection window status can be generated by an instruction pipeline. In other integrated circuits, the stall injection window status is generated by a state machine or other execution control or status logic. In any case, the stall injection window status provides an indication of the specific status of the activity for the integrated circuit. If an execution stall signal were allowed to be asserted at any time, the integrated circuit might fail if it could not immediately stall during a given clock cycle. Thus, the stall injection window status 317 coordinates when stalls can occur.

The programmable M-bit counter 504 provides a programmable delay between changes in the frequency in the throttled clock TCLK 307. The delay between changes in the frequency of the throttled clock TCLK 307 allows the instantaneous current change di/dt to relax and gradually change over a larger period of time to reduce heat generation and a temperature rise that might otherwise be associated therewith.

The state machine 502 in conjunction with the programmable M-bit counter 504 basically manages the sequence of the clock throttling to achieve a safe di/dt level. The number of states in the state machine 502 is equivalent to $2^X$ where X is the number of bits in the X-bit counter 506.

The clock throttling controller 312 functions to turn OFF or shut down the throttled clock TCLK 307 as follows. The N stages of the LFSR 510 establishes a time period window of N clock cycles for the throttled clock TCLK. For the logical gate 306 being an AND gate, if the GCLNTL 320 remains at a logical high or one level during the entire N clock cycles then there is no change in the frequency of TLCK 307 from clock CLK 303. For the logical gate 306 being an AND gate, if the GCLNTL 320 goes to a logical low or zero level during some cycles of the N clock cycles of the window, there is a reduction in the number of clock pulses in TCLK 307 in comparison with clock CLK 303 and effectively a reduction in frequency of TCLK there-from as well. When gradually reducing the frequency of TCLK 307, the GCLNTL 320 effectively masks one or more clock cycles of the N clock cycles of the window. If one clock cycle is to be masked, the state machine 502 controls one of the N stages of the LSFR 510 so that its multiplexor 514 momentarily selects the zero level for shifting into the D flip-flop 516. The zero level is then shifted through the LSFR 510 to the CGNTL 320 so that it goes low for the selected clock cycle and masks the clock cycle in TCLK 307 from occurring. This masking of the clock cycle in the window of N cycles is repeated for a period of time sufficient to allow the instantaneous current di/dt change to relax before further reduction in frequency. Thereafter more clock cycles can be masked in order to obtain a further reduction in frequency up until the entire N clock cycles are masked effectively shutting OFF TCLK 307. In the case that TCLK 307 is shut OFF, the LSFR 510 shifts a constant zero so that CGNCTL 320 stays at a logical low or zero level so that TCLK 307 is masked to a constant level. The masking process can be reversed and the frequency increased by the state machine 502. In this case, the state machine controls one or more of the multiplexors 514 in the N stages 512A–512N of the LFSR 510 so that the logical high or one level is selected for input into the D flip flops 516. The logical high or one level for the given clock cycles are then shifted through the LSFR 510 onto CGNTL to unmask and have the clock cycles of the clock CLK 303 generated onto TCLK 307 through the logical gate 306. The increase in frequency can be gradually increased by selecting the number of clock cycles unmasked during the N clock cycles of the window. The M-bit counter provides the amount of relaxation between changes in the state of the frequency.

Figure 6:
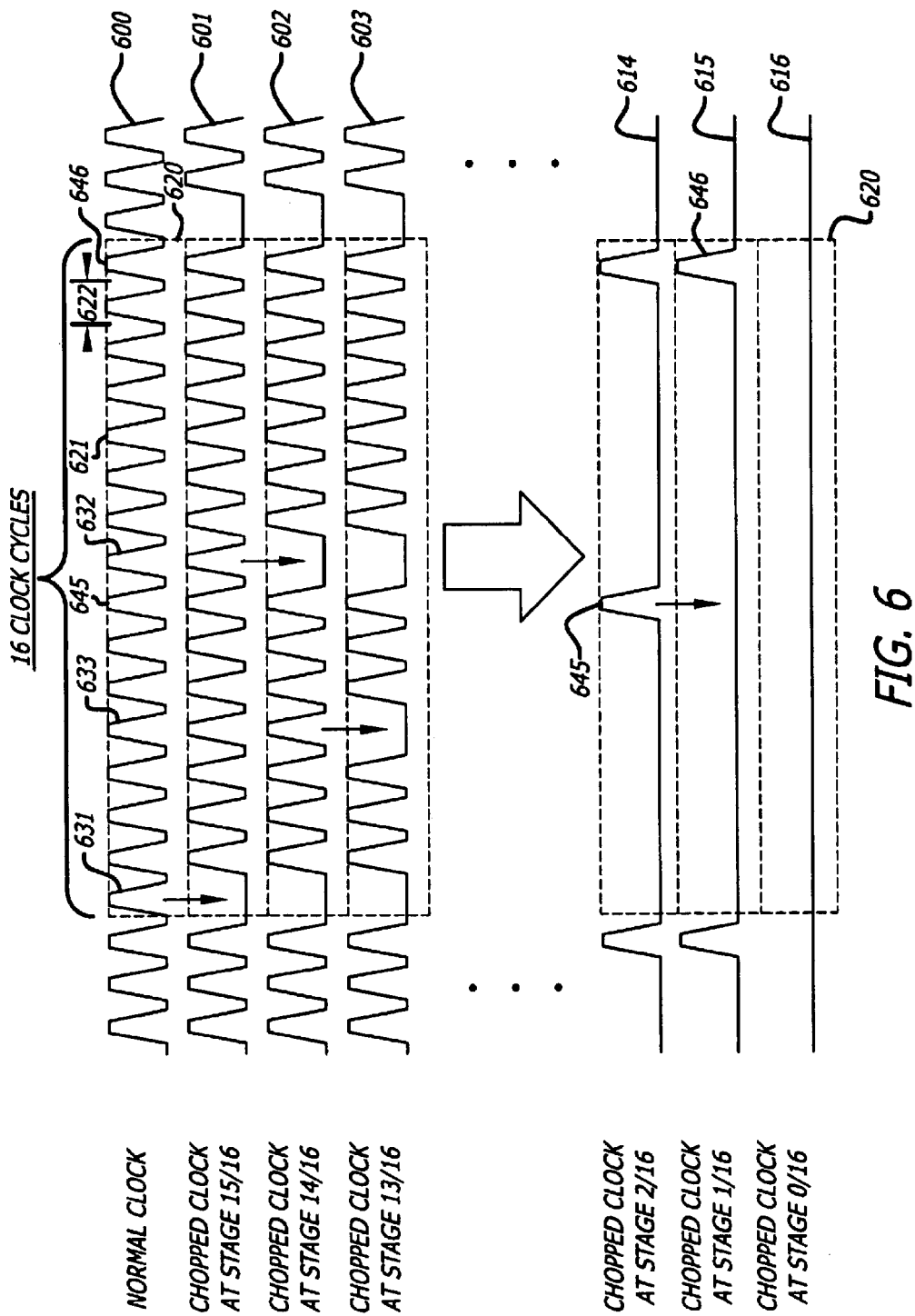
FIG. 6 is waveform diagrams illustrating the transitioning of a throttled clock signal generated by the clock throttling controller of the present invention.

Referring now to FIG. 6, waveforms 600–616 illustrate an exemplary transitioning of the throttling clock signal TCLK 307 to a turned OFF state in response to the thermal clock throttling control of the present invention. The clock waveform is chopped at each stage in waveforms 601-616, reducing the frequency by gating or masking out one clock cycle at each, for example. An interval of time is provided from one stage to the next in order to relax the instantaneous current di/dt.

In waveform 600, throttling clock signal TCLK 307 has a normal clock frequency which is similar to the frequency of the free-running clock FCLK 305. In a given window 620 of a period of time, waveform 600 has sixteen clock pulses 621 in sixteen clock cycles 622 such that N=16. In waveform 600, the clock frequency ratio is N/N=16/16=1. The clock throttling controller 312 of the present invention then reduces the frequency be gating or masking out one clock cycle, such as clock cycle 631, within the given window 620 to reduce the frequency by the ratio of (N−1)/N. In this case, stage 15 of the sixteen stages of the LSFR 510 is selected to mask out (i.e. chop out) the one clock cycle 631. After a period of time for relaxation of the instantaneous current di/dt at this frequency for TCLK 307, a next lower frequency level can be selected. In waveform 602, clock cycles 631 and 632 are masked out to achieve yet another reduction in frequency for TCLK 307. After another period of relaxation in the instantaneous current di/dt, a next lower frequency level can be selected. In waveform 603, clock cycles 631, 632 and 633 are masked out to achieve another gradual reduction in frequency for TCLK 307. This can be continued so on and so forth. In waveform 614 all clock cycles but for clock cycles 645 and 646 are masked out of TCLK 307. In waveform 615 only clock cycle 646 is not masked out of TCLK. Finally, waveform 616 illustrates TCLK being completely masked out so that it is at a constant level, effectively placing TCLK into an OFF state.

The throttling clock signal TCLK 307 can transition in a similar manner in reverse order from a turned OFF state, exemplified by waveform 616, to a fully turned ON state, exemplified by waveform 600, with relaxation periods between changes in frequency so that the frequency of TCLK is gradually increased. It is understood that number of clock pulses and the selected clock pulse or pulses therein for gating by the clock throttling controller can vary from implementation to implementation when gradually reducing the clock frequency or gradually increasing the clock frequency.

The thermal activity detector 310 can be formed to measure activity in the functional blocks and the circuitry of an integrated circuit in a number of different ways. One way in which for the thermal activity detector 310 to obtain a measure of the global activity of the chip is to first receive a localized measure of activity from each functional block, weight the local activity as to how much thermal heat is generated for the given activity and sum the weighted local measures of activity together over a period of time such as one or more clock cycles. The thermal activity detector 310 is then responsible for comparing the global measure of functional activity and comparing it against a thermal activity threshold in order to determine whether or not thermal throttling should be enabled and the enable thermal throttling signal 313 should be generated. Furthermore, the thermal activity detector 310 determines how much does the measure of global activity exceed the thermal activity threshold to determined how much thermal throttling of the clock needs to take place. That is, the number of clock cycles for thermal throttling can be based upon how much the thermal activity threshold is exceeded by the measure of global activity of the integrated circuit.

Figure 7:
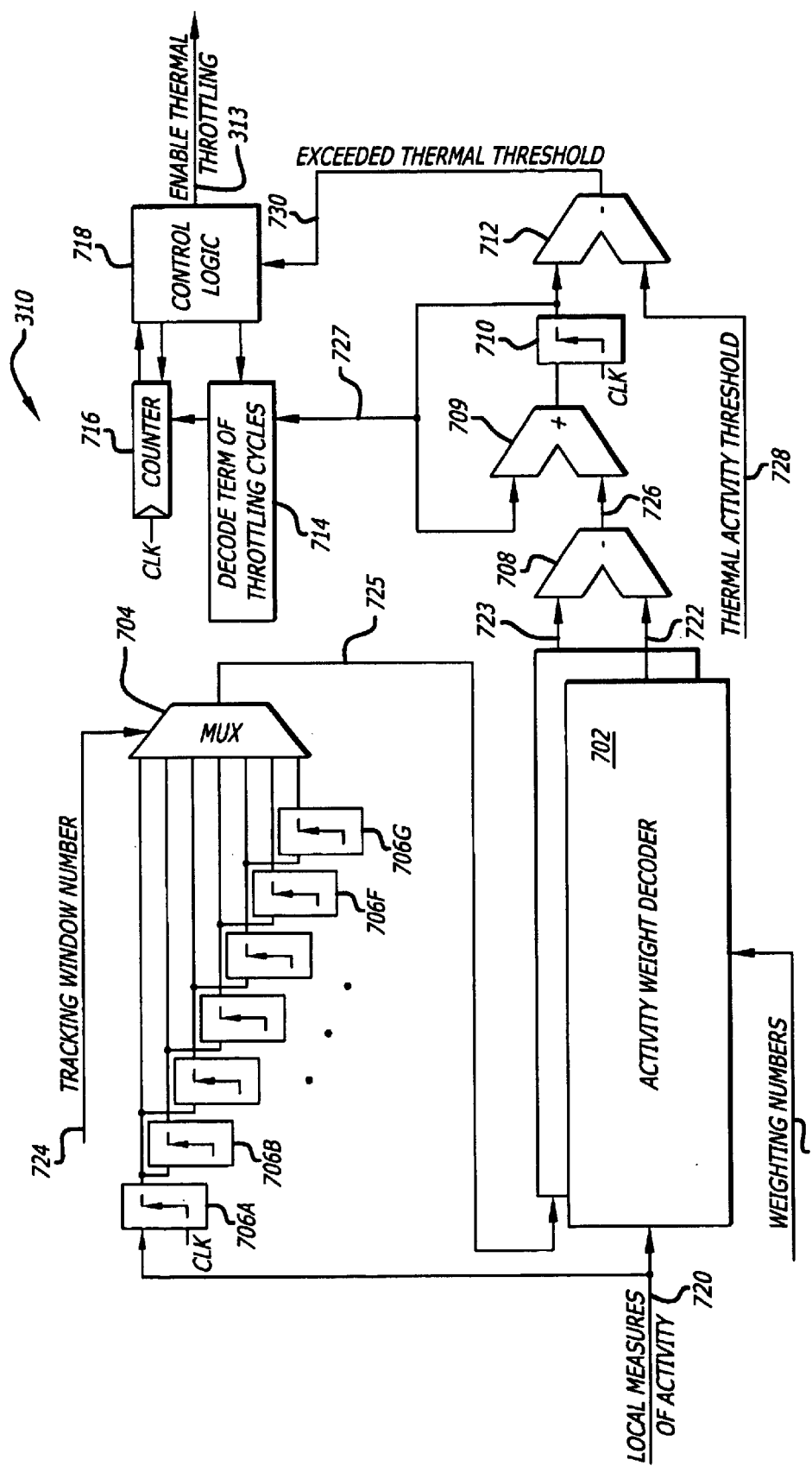
FIG. 7 is an exemplary block diagram of a thermal activity detector for the present invention.

Referring now to FIG. 7, an exemplary functional block diagram of a thermal activity detector 310 is illustrated. The thermal activity detector 310 includes an activity weight decoder 702, a multiplexor 704, D flip-flops 706A–706G, a subtractor 708, an adder 709, a D flip-flop 710, a second subtractor (i.e. comparator) 712, a throttling cycle decoder 714, a counter 716 and control logic 718 coupled together as illustrated in FIG. 7.

The activity weight decoder 702 generates a predetermined value of current activity from a measure of local activity provided to it. The measure of local activity may be a digital signal indicating high or low levels of local functional activity for a given functional block. The activity weight decoder 702 receives local measures of activity 720 from the various functional blocks of the integrated circuit 201 and the respective associated weighting numbers 721 for the functional blocks to generate a current level of global functional activity 722. The associated weighting number 721 can be adjusted accordingly. The activity weight decoder 702 receives past measures of local activity 725 through the multiplexor for an associated tracking window number 724 of tracking windows and the respective associated weighting numbers 721 for the functional blocks to generate a past level of global functional activity 723. The total number of tracking windows can also be adjusted accordingly.

The subtractor 708 receives the past level 723 and the current level 722 as operands and subtracts one from the other to generate a change in global activity level which is coupled into adder 709. Adder 709 is configured with D flip-flop 710 to act as an accumulator accumulating an accumulated change in global activity levels 727. The accumulated change in global activity level 727 is compared with a thermal activity threshold 728 by the subtractor 712 and if its exceeded indicating a globally high activity level, the subtractor 712 generates the exceeded thermal threshold signal 730. The exceeded thermal threshold signal 730 is coupled into the control logic 718. The accumulated change in global activity level 727 is coupled into the throttling cycle decoder 714 to determine the number of cycles 729 (i.e. the period or term) over which thermal throttling should be performed. The higher the measure of accumulated change in global activity level 727, the greater the number of cycles 729 and the longer the period over which thermal throttling is performed.

The number of cycles 729 is coupled into the counter 716 which in turn signals the number of remaining cycles to the control logic 718. Counter 716 is clocked by the free-running clock CLK 303. The control logic 718 generates the enable thermal throttling signal 313 in response to the exceed thermal threshold signal 730 and the number of remaining cycles provided by the counter 716. The counter 716 counts down while thermal throttling is active and the thermal threshold is exceeded. Note that the functional blocks illustrated in FIG. 7 are only one exemplary embodiment of how the global functional activity on an integrated circuit can be measured and compared against a thermal activity threshold level.

The present invention has many advantages over the prior art. One advantage of the present invention is that the gradual thermal throttling of clocks safely turns OFF and ON the clocks to avoid instantaneous current spikes. Another advantage of the present invention is that global thermal throttling can be provided taking into account the global functional activities within an integrated circuit in order to reduce the temperature of the overall integrated circuit. Still another advantage of the present invention is that the global thermal throttling of the present invention can be utilized with local thermal throttling provided locally at or within the functional blocks. Still another advantage of the present invention is that the thermal throttling is digital which is deterministic and can provide a fast response.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Additionally, it is possible to implement the present invention or some of its features in hardware, firmware, software or a combination thereof where the software is provided in a processor readable storage medium such as a magnetic, optical, or semiconductor storage medium.

What is claimed is:

1. A method comprising:
   receiving a plurality of localized measures of activity in an integrated circuit;
   generating a measure of global functional activity in the integrated circuit responsive to the plurality of localized measures of activity;
   determining if a predetermined limit of activity has been met or exceeded by the measure of global functional activity in the integrated circuit;
   and if so, then
   gradually reducing a high frequency of clocking of circuitry to zero to stop the clocking of circuitry,
   waiting a first predetermined time after stopping the clocking of circuitry, and
   starting the clocking of circuitry at a low frequency.

2. The method of claim 1, wherein
   if the predetermined limit of activity has not been met or exceeded by the measure of global functional activity, repeating the receiving, the generating, and the determining.

3. The method of claim 1, wherein
   the first predetermined time is a number of clock cycles of a free-running clock of the integrated circuit.

4. The method of claim 1 wherein,
   the gradual reducing of the high frequency clocking of circuitry to zero includes
   clocking circuitry at a first frequency, and,
   before clocking the circuitry at a second frequency lower than the first frequency,
   waiting a second predetermined time during the clocking of the circuitry at the first frequency.

5. The method of claim 1, wherein,
   after starting the clocking of the circuitry at the low frequency, the method further includes
   gradually increasing the frequency of the clocking of the circuitry to the high frequency.

6. The method of claim 5 wherein,
   the gradual increasing of the frequency of the clocking of circuitry to the high frequency includes
   clocking circuitry at a first frequency, and,
   before clocking the circuitry at a second frequency higher than the first frequency,
   waiting a second predetermined time during the clocking of the circuitry at the first frequency.

7. The method of claim 5, wherein
   the starting of the clocking of the circuitry at the low frequency and the gradual increase in the frequency of the clocking of the circuitry to the high frequency avoids large variations in current otherwise associated with a rapid turn-on of the clocking of circuitry.

8. The method of claim 1, wherein,
   an estimated temperature level of the integrated circuit is proportional to the global functional activity in the integrated circuit and
   the predetermined limit of activity is proportional to an expected temperature level of the integrated circuit.

9. The method of claim 8, wherein,
   the expected temperature level of the integrated circuit is one-hundred twenty five degrees centigrade, a maximum operating junction temperature for silicon.

10. The method of claim 8, wherein,
    the expected temperature level of the integrated circuit is one-hundred ten degrees centigrade, a maximum case temperature under bias.

11. The method of claim 8, wherein,
    the expected temperature level of the integrated circuit is eighty-five degrees centigrade, an operational case temperature.

12. The method of claim 8, wherein,
    the expected temperature level of the integrated circuit is seventy degrees centigrade, a maximum ambient air temperature.

13. The method of claim 8, wherein,
    the expected temperature level of the integrated circuit is fifty-five degrees centigrade, a maximum air temperature.

14. The method of claim 1, wherein
    the gradual reducing of the high frequency clocking of the circuitry to zero avoids large variations in current otherwise associated with a rapid shut-off of the clocking of circuitry.

15. The method of claim 1, wherein
    a localized measure of activity in the integrated circuit is a number of logic gates within a functional block with an output change of state.

16. The method of claim 1, wherein
    a localized measure of activity in the integrated circuit is a number of nodes within a functional block switching from one logical state to another.

17. The method of claim 1, wherein
    the measure of global functional activity is generated by weighting the plurality of localized measures of activity to generate weighted localized measures of activity, and
    summing the weighted localized measures of activity together over a period of time.

18. An integrated circuit comprising:
    a clock generator to generate a clock;
    an activity detector to receive a plurality of localized measures of activity of functional blocks in the integrated circuit and generate a measure of global functional activity of the integrated circuit responsive to the plurality of localized measures of activity; and
    a clock throttling controller coupled to the activity detector and the clock generator, the clock throttling controller to generate a throttled clock to couple to the functional blocks of the integrated circuit for clocking circuitry therein, the clock throttling controller to gradually throttle the frequency of the throttled clock to the functional blocks in response to the measure of the global functional activity meeting or exceeding a predetermined limit of activity.

19. The integrated circuit of claim 18, wherein,
    the activity detector compares the measure of the global functional activity with the predetermined limit of activity to determine if it is met or exceeded, and
    the activity detector signals to the clock throttling controller whether or not the predetermined limit of activity has been met or exceeded.

20. The integrated circuit of claim 18, wherein,
    one hundred percent of circuitry in the functional blocks can have the throttled clock stopped.

21. The integrated circuit of claim 18, wherein,
    less than one hundred percent of circuitry in the functional blocks can have the throttled clock stopped.

22. The integrated circuit of claim 21, wherein,
only circuitry to which the throttled clock can be stopped is the throttled clock coupled and its frequency gradually throttled in response to the measure of the global functional activity meeting or exceeding the predetermined limit of activity.

23. The integrated circuit of claim 18, wherein,
the frequency of the throttled clock is gradually throttled OFF in response to the measure of the functional activity meeting or exceeding the predetermined limit of activity and
after being OFF for a predetermined period of time, the throttled clock is then gradually throttled ON.

24. The integrated circuit of claim 18, wherein,
the predetermined limit of activity is proportional to a well known temperature level for integrated circuits.

25. The integrated circuit of claim 24, wherein,
the well known temperature level for integrated circuits is one-hundred twenty five degrees centigrade, a maximum operating junction temperature for silicon.

26. The integrated circuit of claim 24, wherein,
the well known temperature level for integrated circuits is one-hundred ten degrees centigrade, a maximum case temperature under bias.

27. The integrated circuit of claim 24, wherein,
the well known temperature level for integrated circuits is eighty-five degrees centigrade, an operational case temperature.

28. The integrated circuit of claim 24, wherein,
the well known temperature level for integrated circuits is seventy degrees centigrade, a maximum ambient air temperature.

29. The integrated circuit of claim 24, wherein,
the well known temperature level for integrated circuits is fifty-five degrees centigrade, a maximum air temperature.

30. The integrated circuit of claim 18, wherein,
the clock throttling controller gradually throttles down the frequency of the throttled clock to zero in response to the measure of the global functional activity meeting or exceeding the predetermined limit of activity.

31. The integrated circuit of claim 30, wherein,
after a predetermined period of time with the frequency of the throttled clock at zero, the clock throttling controller gradually throttles up the frequency of the throttled clock from zero.

32. The integrated circuit of claim 18, wherein
a localized measure of activity of a functional block in the integrated circuit is a number of logic gates within the functional block with an output change of state.

33. The integrated circuit of claim 18, wherein
a localized measure of activity of a functional block in the integrated circuit is a number of nodes within the functional block switching from one logical state to another.

34. The integrated circuit of claim 18, wherein
to generate the measure of global functional activity, the activity detector to
  weight the plurality of localized measures of activity to generate weighted localized measures of activity and
  sum the weighted localized measures of activity together over a period of time.

35. An integrated circuit comprising:
a clock generator to generate a clock;
an activity detector to measure global functional activity of the integrated circuit;
a clock throttling controller coupled to the activity detector and the clock generator, the clock throttling controller to generate a throttled clock to couple to functional blocks of the integrated circuit for clocking circuitry therein, the clock throttling controller to gradually throttle the frequency of the throttled clock to the functional blocks in response to the measure of the global functional activity meeting or exceeding a predetermined limit; and
a logical gate coupled to the clock generator and the clock throttling controller, the logical gate to receive the clock from the clock generator and a control signal from the clock throttling controller, the logical gate to periodically mask out one or more clock cycles of the clock to generate the throttled clock in response to the control signal and gradually throttle down the frequency of the throttled clock.

36. The integrated circuit of claim 35, wherein,
the logical gate is an AND gate to logically AND the clock and the control signal from the clock throttling controller together to periodically mask out the one or more clock cycles of the clock in response to the control signal and generate the throttled clock.

37. The integrated circuit of claim 35, wherein
a localized measure of activity of a functional block in the integrated circuit is a number of logic gates within the functional block with an output change of state.

38. The integrated circuit of claim 35, wherein
a localized measure of activity of a functional block in the integrated circuit is a number of nodes within the functional block switching from one logical state to another.

39. The integrated circuit of claim 35, wherein,
the activity detector receives measures of local functional activity associated with each functional block of the integrated circuit to measure the global functional activity of the integrated circuit.

40. The integrated circuit of claim 35, wherein,
the activity detector receives measures of local functional activity associated with each functional block of the integrated circuit to determine the measure of the global functional activity of the integrated circuit,
the activity detector compares the measure of the global functional activity with the predetermined limit to determine if it is met or exceeded, and
the activity detector signals to the clock throttling controller whether or not the predetermined limit has been met or exceeded.

41. The integrated circuit of claim 35, wherein,
the throttled clock is coupled to circuitry to which the throttled clock can be stopped, and
the frequency of the throttled clock is gradually throttled in response to the measure of the global functional activity meeting or exceeding the predetermined limit.

42. The integrated circuit of claim 35, wherein,
the frequency of the throttled clock is gradually throttled OFF in response to the measure of the functional activity meeting or exceeding the predetermined limit and
after being OFF for a predetermined period of time, the throttled clock is then gradually throttled ON.

43. The integrated circuit of claim 35, wherein
the measure of global functional activity of the integrated circuit is responsive to localized measures of activity, the localized measures of activity corresponding respectively to local functional activity of a plurality of functional blocks in the integrated circuit.

44. The integrated circuit of claim 43, wherein
to generate the measure of global functional activity, the activity detector to weight the localized measures of activity to generate weighted localized measures of activity and sum the weighted localized measures of activity together over a period of time.

45. A clock generator comprising:
a free-running clock generator to generate a free-running clock;
an activity detector to receive a plurality of measures of local functional activity respectively associated with a plurality of functional blocks of an integrated circuit, to and generate a total measure of functional activity of the integrated circuit responsive to the plurality of measures of local functional activity, to determine whether or not the total measure of functional activity exceeds a predetermined limit of activity, and to generate an enable throttling signal responsive to a determination that the total measure of functional activity exceeds the predetermined limit of activity; and
a clock throttling controller coupled to the activity detector and the free-running clock generator, the clock throttling controller to generate a throttled clock to couple to the functional blocks of the integrated circuit for clocking circuitry therein, the clock throttling controller to gradually throttle the frequency of the throttled clock to circuitry of the functional blocks in response to the enable throttling signal.

46. The clock generator of claim 45, wherein,
the clock throttling controller gradually throttles down the frequency of the throttled clock to zero in response to the enable throttling signal.

47. The clock generator of claim 46, wherein,
after a predetermined period of time with the frequency of the throttled clock at zero, the clock throttling controller gradually throttles up the frequency of the throttled clock from zero.

48. The clock generator of claim 45, wherein,
the predetermined limit of activity is proportional to a well known temperature level for integrated circuits.

49. The clock generator of claim 48, wherein,
the well known temperature level for integrated circuits is one-hundred ten degrees centigrade, a maximum case temperature under bias.

50. The clock generator of claim 48, wherein,
the well known temperature level for integrated circuits is eighty-five degrees centigrade, an operational case temperature.

51. The clock generator of claim 48, wherein,
the well known temperature level for integrated circuits is seventy degrees centigrade, a maximum ambient air temperature.

52. The clock generator of claim 48, wherein,
the well known temperature level for integrated circuits is fifty-five degrees centigrade, a maximum air temperature.

53. The clock generator of claim 45, wherein,
a measure of local functional activity of a functional block in the integrated circuit is a number of logic gates within the functional block with an output change of state.

54. The clock generator of claim 45, wherein
a measure of local functional activity of a functional block in the integrated circuit is a number of nodes within the functional block switching from one logical state to another.

55. The clock generator of claim 45, wherein,
to generate the total measure of functional activity, the activity detector to weight the measures of local functional activity to generate weighted measures of local functional activity and sum the weighted measures of local functional activity together over a period of time.

56. A clock generator comprising:
a free-running clock generator to generate a free-running clock;
a thermal activity detector to generate a total measure of functional activity in an integrated circuit and to determine whether or not the total measure of functional activity meets or exceeds a thermal limit of activity to generate an enable thermal throttling signal; and
a clock throttling controller coupled to the thermal activity detector and the free-running clock generator, the clock throttling controller to generate a throttled clock to couple to functional blocks of the integrated circuit for clocking circuitry therein, the clock throttling controller to gradually throttle the frequency of the throttled clock to circuitry of the functional blocks in response to the enable thermal throttling signal,
wherein the clock throttling controller includes
a linear feedback shift register connected in a loop to generate a clock gating control signal, the clock gating control signal to selectively mask out clock cycles in the throttled clock to gradually reduce its frequency and to selectively insert clock cycles into the throttled clock to gradually increase its frequency, and
a state machine coupled to the linear feedback shift register to control the selective masking out of clock cycles and the selective inserting of clock cycles in the throttled clock to gradually throttle the frequency down to shut, OFF the throttled clock and gradually throttle the frequency up from being shut OFF in response to the enable thermal throttling signal.

57. The clock generator of claim 56, wherein,
the clock throttling controller further includes,
a programmable counter to count a programmable delay time between changes in frequency of the throttled clock.

58. The clock generator of claim 56, wherein,
the total measure of functional activity is responsive to a plurality of measures of local functional activity of functional blocks in the integrated circuit.

59. The clock generator of claim 58, wherein
a measure of local functional activity of a functional block in the integrated circuit is a number of nodes within the functional block switching from one logical state to another, a number of logic gates within the functional block with an output change of state, or a combination thereof.

* * * * *